United States Patent [19]
Avitan

[11] Patent Number: 5,585,706
[45] Date of Patent: Dec. 17, 1996

[54] SPEED REGULATION OF DC MOTOR USING CURRENT SENSING MEANS

[76] Inventor: Isaac Avitan, c/o Schaeff Incorporated P. O. Box 9700, Sioux City, Iowa 51102

[21] Appl. No.: 815,395

[22] Filed: Dec. 31, 1991

[51] Int. Cl.$^6$ ............................................. H03P 5/16
[52] U.S. Cl. .................................. 318/493; 388/806
[58] Field of Search ........................ 318/766, 539, 318/139, 493; 388/803–807

[56] References Cited

U.S. PATENT DOCUMENTS

| | | | |
|---|---|---|---|
| 3,735,220 | 5/1973 | Renner et al. | 318/139 |
| 3,989,990 | 11/1976 | Thompson | 318/493 X |
| 4,037,144 | 7/1977 | Ohmae | 318/493 X |
| 4,189,667 | 2/1980 | Baxer | 318/493 X |
| 4,191,914 | 3/1980 | Lecluse | 318/493 X |
| 4,284,932 | 8/1981 | Kawada et al. | 318/493 X |
| 4,408,147 | 10/1983 | Gabel | 318/493 |
| 4,484,117 | 11/1984 | Bose | 318/493 |
| 4,511,825 | 4/1985 | Klimo | 318/67 |
| 4,634,941 | 1/1987 | Klimo | 318/139 |

Primary Examiner—David S. Martin
Attorney, Agent, or Firm—Natter & Natter

[57] ABSTRACT

A system for controlling a separately excited dc motor, where control is achieved through a microprocessor-based independent PWM control of a chopper (armature) and an H-bridge (field), and where mechanical speed sensors are not used. Connected to the armature is an armature voltage amplifier for varying the applied armature voltage. A field current amplifier is also provided for determining the direction of motor rotation and varying the voltage applied to the field winding. A decoupling controller adjusts the armature voltage and the field current.

14 Claims, 3 Drawing Sheets

SPEED REGULATION OF DC MOTOR USING CURRENT SENSING MEANS

BACKGROUND OF THE INVENTION

The present invention relates to dc motor controllers having separately excited armature and field windings and, more particularly, to control systems without mechanical speed sensors.

Electric motors are used to power such mechanisms as appliances, trains, cranes, elevators, fork lifts, lawnmowers, passenger cars and the like. Depending on the application, the motor torque loading can be dramatically affected by terrain, loading capacity variations, etc. For these reasons and more, it is desirable to have a control system capable of extracting precise and efficient work from the appliance or vehicle. Further, it is desirable to perform such tasks prudently and economically.

In a battery-powered electrically driven vehicle, the main motive element, referred to as the traction system, conventionally consists of a series-wound dc motor typically coupled to a gear reducer and one or more drive wheels. Direction of rotation of the series-wound dc motor is controlled by the polarity orientation of the field winding with respect to the armature winding. Under conventional control, the field winding orientation is typically controlled through a pair of contactors, such that when power is applied across the field-armature combination, the motor is caused to rotate in the desired direction.

The series-wound dc motor has a very important feature: its high starting torque characteristics. However, under conventional control, the series-wound dc motor also has a major drawback. It is limited to operation along its characteristic commutation curve limit. This results in motor speed variations due to changing torque loading arising from variations in terrain, loading capacity, etc.

It is, however, possible to control the series-wound dc motor in such a fashion that the armature and field windings are separately and totally variably excited. That is to say, both the armature and field windings are independently excited, and the field is also under total variable control, as opposed to the conventional series-driven, contactor-based field control. This method of control overcomes the conventional control's aforementioned constraint of operation only along its characteristic commutation curve limit. Rather, the series-wound dc motor is now capable of being operated anywhere under its characteristic commutation curve limit. This results in improved motor controllability which is independent of motor torque loading.

The separately excited and totally variable armature and field control requires a microprocessor-based fully transistorized chopper (armature) and H-Bridge (field) control system.

Applying this separately excited and totally variable armature and field control to a series-wound dc motor results in an impractical implementation, both from a size and cost point of view, due to the typical field current levels of such motors.

To reduce packaging size and cost, it is possible to utilize a shunt-wound dc motor due to its reduced field current characteristics. However, under conventional control, where the shunt-wound dc motor's field excitation is constantly applied, the shunt-wound dc motor is incapable of providing high starting torques, and would, therefore, not be a reasonable replacement for the series-wound dc motor. But, under the separately excited and totally variable armature and field control, the shunt-wound dc motor can be made to operate with the characteristics of a series-wound dc motor, or any other motor, economically and practically.

U.S. Pat. No. 5,070,283 issued to the present inventor discloses a system for controlling a separately excited shunt-wound dc motor, where control is achieved through microprocessor-based independent pulse width modulated (PWM) frequency control of a chopper (armature) and an H-bridge (field). Connected to the armature is an armature voltage amplifier for varying the applied armature voltage. A field voltage amplifier is also provided for determining the direction of motor rotation and for varying the voltage applied to the field winding. Sensors are connected to the motor armature in order to determine the motor speed and armature current information, and to adjust the armature voltage and field voltage, so as to attain decoupling control (independent torque-speed characteristics).

U.S. Pat. No. 5,039,924 also issued to the present inventor discloses a system for controlling a separately excited shunt-wound dc motor, where control is achieved through microprocessor-based independent pulse-width-modulated/frequency control of a chopper (armature) and an H-Bridge (field). Connected to the armature is an armature voltage amplifier for varying the applied armature voltage. A field voltage amplifier is also provided for determining the direction of motor rotation and varying the voltage applied to the field winding. Sensors are connected to the motor armature and field in order to determine the motor speed, armature current, and field current information, and to adjust the armature voltage and field voltage, so as to optimize the motor's operating efficiencies.

It would be advantageous to provide a motor control system capable of producing variable torque while maintaining constant speed.

It would also be advantageous to provide a system which the characteristics of a series-wound dc motor could be simulated using a shunt-wound dc motor.

It would further be advantageous to provide a system in which a dc motor's field and armature windings are separately excited and controlled.

It would also be advantageous to provide a system in which the motor can be controlled by a decoupling controller.

It would still further be advantageous to provide a system in which the decoupling controller is achieved using software.

It would also be advantageous to provide a system in which the decoupling controller regulates motor speed without mechanical speed sensors.

It would also be advantageous to provide a system in which the dc motor's operating efficiency can be optimized without mechanical speed sensors.

SUMMARY OF THE INVENTION

Independent field and armature control enables control of a motor anywhere along and below its characteristic commutation curve limit. While a bypass contactor may be employed across the armature voltage switching device to reduce power losses, independent field control extends controllability of the motor, thereby making the system less sensitive to variations in load capacities, travel path conditions and grade variations.

A shunt-wound dc motor is the main motive mechanism replacement for the traditional series-wound dc motor. The shunt-wound dc motor's field windings require far less current than its series-wound counterpart, thereby making it economically feasible to apply full variability (voltage switching) field control.

Field and armature voltage switching is achieved through the utilization of power transistors as opposed to the traditional SCRs. Although SCRs provide an inexpensive means of voltage switching, they are limited in switching speed and require additional circuitry due to their non-self-commutating characteristics.

In accordance with the present invention, there is provided a system for controlling separately excited shunt-wound dc motors, where control is achieved through microprocessor-based independent pulse-width-modulation (PWM) control of a chopper (armature) and an H-bridge (field). Connected to the armature is an armature voltage amplifier for varying the applied armature voltage. A field voltage amplifier is also provided for varying the voltage applied to the field winding. A decoupling controller adjusts the armature voltage and the field voltage.

The use of such a system results in many benefits, including, but not limited to, precise velocity control, precise torque control, optimized efficiency, increased performance, increased reliability and decreased system cost.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

Before describing the preferred embodiment of the present invention, it is desirable to discuss briefly the speed/torque characteristics of a series-wound dc motor.

Figure 1:
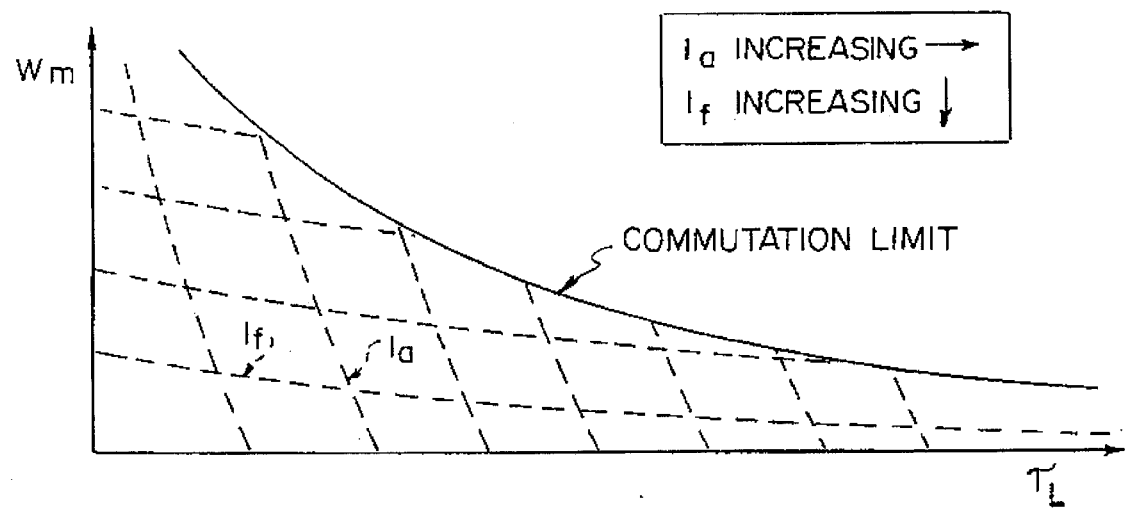
FIG. 1 is a graphical representation of a typical speed/torque relationship for a series-wound dc motor.

Referring now to FIG. 1, there is shown a typical speed/torque graph for a series-wound dc motor showing the characteristic commutation limit, field current $I_f$ lines, and the armature current $I_a$ lines.

As discussed above, under conventional control a series-wound dc motor is restricted to operation along its characteristic commutation limit as represented by the motor rotational speed $W_m$ and motor shaft torque loading $T_L$. Hence, as can be seen from FIG. 1, a change in $T_L$ results in a change in $W_m$.

However, under independent and fully variable field and armature control, a change in $T_L$ may not necessarily result in a change in $W_m$. Rather, as described in aforementioned U.S. Pat. No. 5,070,283, herein incorporated by reference, a control system can select a new motor operating point through $I_a$ and $I_f$ under the commutation limit, resulting in an unchanged $W_m$ for the new torque loading value $T_L$.

Figure 2:
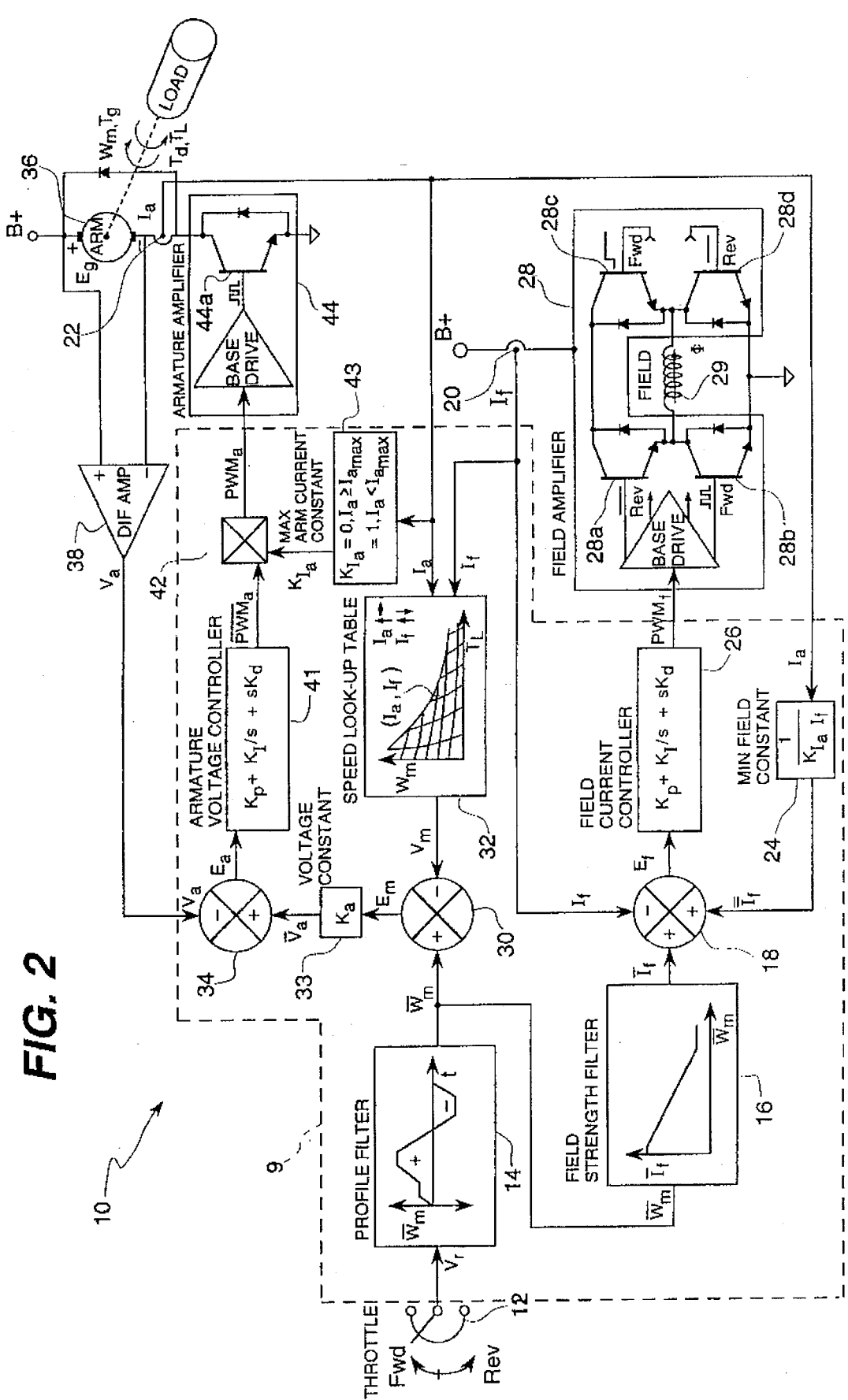
FIG. 2 is a block diagram of the control system of the present invention.

Referring now to FIG. 2, there is shown a block diagram of the control system of the present invention. The control system is referred to generally as reference numeral 10. A program resides within a microprocessor, not shown, and is identified in the FIGURE in phantom lines as reference numeral 9.

A throttle 12 is used to generate a voltage reference signal $V_r$ representative of the desired motor rotational speed. This signal $V_r$ is applied to a profile filter 14 which generates a desired rotational direction and speed reference $\overline{W}_m$. Desired rotational direction/speed signal $\overline{W}_m$ is then applied to a field strength filter 16, the output of which is the desired field current $\overline{I}_f$.

The desired field current $\overline{I}_f$ is then summed by a summer 18 with other signals, as described hereinbelow. The actual field current $I_f$ 20 is read from the field winding circuit and also summed by summer 18. Similarly, the actual armature current $I_a$ 22 is read and multiplied by a minimum field constant multiplier 24, the output of which is a minimum field current signal $\overline{I}_p$ which is also summed by summer 18. At the minimum field constant multiplier 24, the actual armature current $I_a$ is divided by a minimum or optimal field constant ratio $K_{Ialf}$. The minimum field constant ratio $K_{Ialf}$ comprises the square root of the field resistance divided by the armature resistance. Indicated in U.S. Pat. No. 4,247,807 issued Jan. 27, 1981 to Wilson and incorporated herein by reference is the employment of the product of armature current and the inverse of the optimal field constant ratio, i.e., the square root of armature resistance divided by field resistance, for control of field current.

Generation of the minimum field constant ratio is defined in *Microprocessor-Based High Efficiency Drive of a DC Motor*, IEEE Volume 1 E-34, No. 4 by Hong and Park pp. 433–440 equation 5 (p. 434) however, such equation may be further reduced to the square root of the field resistance over armature resistance. The field constant multiplier 24 generates the field current control signal $\overline{I}_f$ which is applied to the summer 18 together with the signal $I_f$. The output of summer 18 is a signal $E_f$ representative of field current error. This signal $E_f$ is applied to a field current controller 26, the output of which is applied to a field amplifier 28. The aforementioned minimum field constant 24 is well known in the art, and its function and description can be found in U.S. Pat. Nos. 5,039,924 (issued Aug. 13, 1991, to Avitan) and 4,247,807 (issued Jan. 27, 1981, to Wilson). Reference thereto also appears in text (*Power Semiconductor Controlled Drives*, by Gopal K. Dubey, pp 54–57, Prentice-Hall, Englewood Cliffs, N.J.; and in the IEEE article, Vol. IE-34, No. 4, by Hong and Park, entitled "Microprocessor-Based High-Efficiency Drive of a DC Motor").

Field amplifier 28 comprises base driving circuitry and four transistors 28a, 28b, 28c and 28d, which together form an H-bridge, which controls current through the motor field winding 29.

The desired rotational direction/speed reference signal $\overline{W}_m$ generated by profile filter 14 is also summed by another summer 30. To summer 30 is applied an actual rotational speed $W_m$ which is either computed or obtained from a look-up table 32. Table 32 has applied to it the actual field current $I_f$ 20 as well as the actual armature current $I_a$ 22.

The output of summer 30 is a signal representative of rotational speed error, $E_m$. This signal $E_m$ is multiplied by a voltage constant $K_a$ 33.

The product of the signal representative of rotational speed error $E_m$ and voltage constant $K_a$ is a desired armature voltage $\overline{V}_a$ signal, which is summed by another summer 34 with a signal representative of actual armature voltage drop $V_a$. This signal $V_a$ is generated by a differential amplifier 38, to which is applied voltages on both sides of the motor armature 36. It should be understood that differential amplifier 38 can be either hardware or software to perform the intended function.

The output of summer 34 is a signal $E_a$ representative of armature error. This signal $E_a$ is applied to an armature voltage controller 41, the output of which is a signal $\overline{PWM}_a$ representative of armature control effort. The $\overline{PWM}_a$ signal is multiplied by a multiplier 42 with a maximum armature current constant $K_{Ia}$. Maximum armature current constant $K_{Ia}$ is either a 0 or a 1, depending upon whether the actual armature current is greater or equal to the maximum allowable current, or whether the actual armature current is less than the maximum allowable current, respectively, as determined by computational block 43. Thus, the actual armature current $I_a$ read at reference numeral 22 is applied to computational block 43 to determine the maximum armature current constant $K_{IA}$ and the output thereof is multiplied by the $\overline{PWM}_a$ signal representative of armature control effort. The output of multiplier 42 is a signal $PWM_a$, which is applied to an armature amplifier 44. Armature amplifier 44 comprises base driving circuitry and a transistor 44a, as shown.

Figure 3:
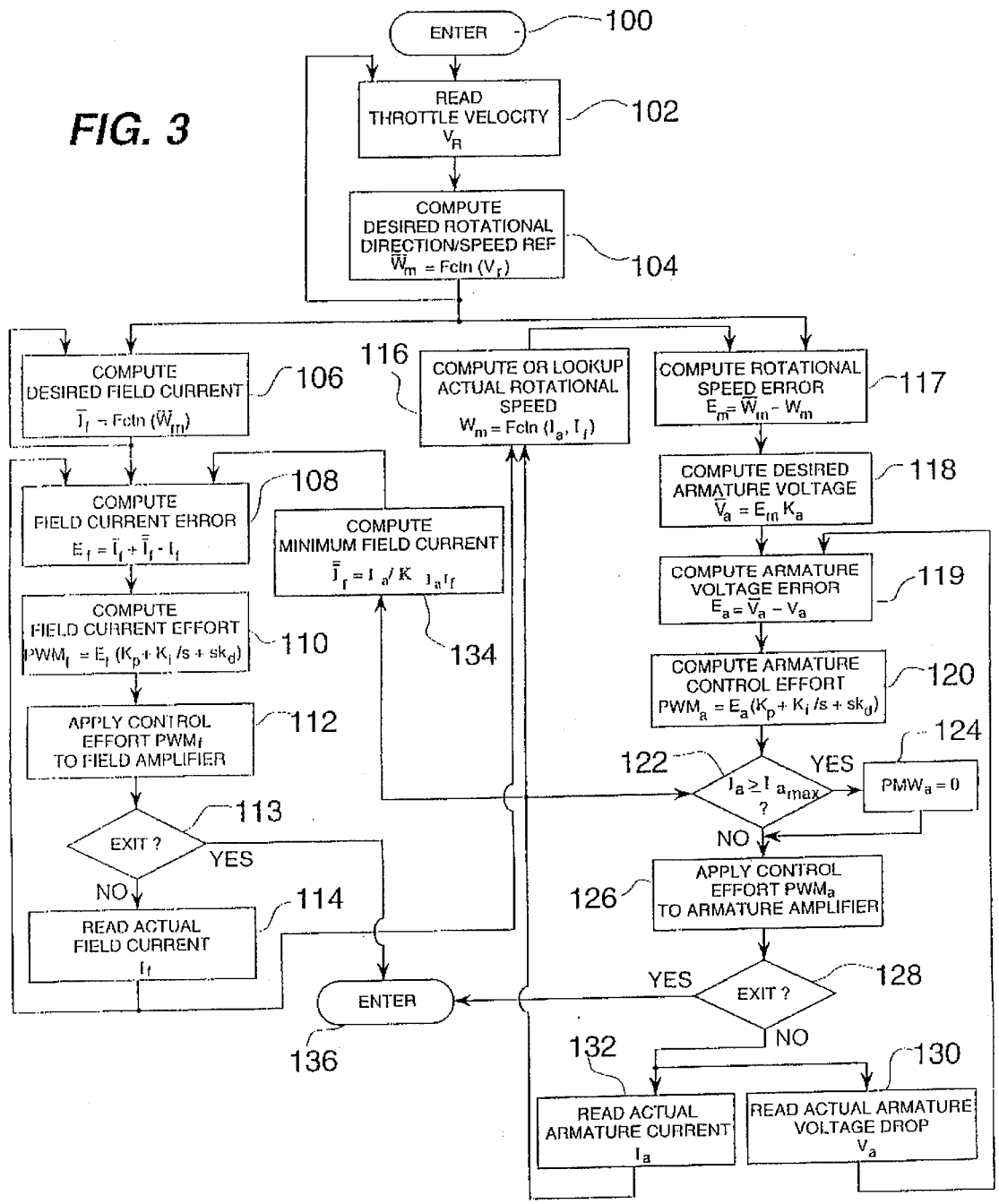
FIG. 3 is a flow chart of control system operations.

Referring now also to FIG. 3, there is shown a flow chart of control system operations, which parallels the foregoing description with respect to FIG. 2, but which may be easier to understand in this form. The control system operates under direction of software 9 (FIG. 2) residing in the microprocessor, not shown.

In operation, the microprocessor controls the processing steps, beginning at step 100. The throttle voltage $V_r$ is read, step 102, and the direction and speed reference signal $\overline{W}_m$ is computed as a function thereof, step 104. The process of reading the throttle voltage and computing the direction and speed reference signal is a continuous one, as indicated by the loop connecting steps 102 and 104.

Once the reference signal $\overline{W}_m$ is computed, step 104, the desired field current $\bar{I}_f$ is computed, step 106. The field current error $E_f$, if any, is then computed, step 108. The field control effort $PWM_f$ is then computed, step 110, and is applied to the field amplifier, step 112. An external routine (not shown) directs the duration of this routine. When the external routine directs an exit of this program (FIG. 3) step 113, execution of the program terminates, step 136. If the program is to continue, however, the actual field current $I_f$ is read, step 114. Actual field current $I_f$ is then applied both to the field current error computation, step 108, and to an algorithm that computes the motor rotational speed $W_m$, step 116. Alternatively, a look-up table may be consulted to obtain the motor rotational speed $W_m$, step 116.

Once the rotational speed $W_m$ is derived, step 116, it is applied to the algorithm that computes the rotational speed error $E_m$, step 117. The desired armature voltage $V_a$ is computed at step 118 and is applied to the armature voltage error $E_a$ algorithm, step 119. The armature control effort $PWM_a$ is then computed, step 120. If the actual armature current $I_a$ is greater than the current limit, step 122, the armature control effort $PWM_a$ is reset to zero, step 124. The armature control effort $PWM_a$ is then applied to the armature amplifier, step 126. An external routine (not shown) directs the duration of this routine. When the external routine directs the exit of this program, step 128, execution of the program terminates, step 136. If the program is to continue, however, the actual armature voltage drop $V_a$ is read, step 130, and applied to armature voltage error algorithm, step 119. Thus, it can be seen that the armature voltage error $E_a$, step 119, is computed as a function of the desired armature voltage $\overline{V}_a$, step 118, and of the actual armature voltage drop $V_a$, step 130.

Once the control effort signal $PWM_a$ has been applied to the armature amplifier, step 126, the actual armature current $I_a$ is read, step 132, and is applied to the process at steps 122 and 116, wherein the actual motor rotational speed $W_m$ is derived. Thus, the motor rotational speed $W_m$ is derived as a function of the actual armature current $I_a$, step 132, and the actual field current $I_f$, step 114.

The actual armature current $I_a$, read at step 132, is also applied to the algorithm that computes the minimum field current signal $\bar{I}_f$, step 134. The minimum field current $\bar{I}_f$ is used by the algorithm that computes the field current error $E_f$, step 108. Thus, the field current error $E_f$, step 108, is a function of the desired field current $\bar{I}_f$, step 106; the actual field current $I_f$, step 114; and the computed minimum field current $\bar{I}_f$, step 134.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A system for control of a dc motor having an armature, a field and separately excited armature and field windings comprising:

i) armature voltage amplifying means operatively connected to the armature winding of said motor for varying voltage applied thereto, ii) field current amplifying means operatively connected to the field winding of said motor for varying current flow through the field winding;

iii) means for generating a signal representative of actual armature speed;

iv) field current sensing means operatively connected to said field winding for sensing field current and for providing a signal representative thereof and being operatively connected to the means for generating a signal representative of actual armature speed;

v) armature current sensing means adapted to be operatively connected to said armature winding for sensing armature current and for providing a signal representative thereof and being operatively connected to the means for generating a signal representative of actual armature speed;

vi) the means for generating a signal representative of actual armature speed including means for receiving the signals representative of armature current and field current and in response to both said current signals, generating a signal representative of actual armature speed, vii) means for generating a reference signal representative of desired armature speed;

viii) means receiving the signals representative of actual armature speed and desired armature speed and in response thereto, generating an armature control signal, the armature voltage amplifying means receiving the armature control signal and in response thereto, controlling the voltage applied to the armature winding of said motor to effect the desired armature speed; and ix) means for generating a field current control signal, the field current amplifying means receiving the field current control signal and in response thereto, controlling current flow through the field winding.

2. A system for control of a dc motor as constructed in accordance with claim 1, wherein said means for generating said reference signal representative of desired armature speed comprises filtering means.

3. A system for control of a dc motor as constructed in accordance with claim 1, wherein the means for generating the armature control signal comprises:

a) first summing means for deriving the difference between said signal representative of actual armature speed and said reference signal representative of desired armature speed to generate a signal representative of speed error.

4. A system for control of a dc motor as constructed in accordance with claim 3, the means for generating the armature control signal further comprising:

b) means for receiving said signal representative of speed error and for multiplying said speed error signal by a voltage constant to provide a reference signal representative of desired armature voltage.

5. A system for control of a dc motor as constructed in accordance with claim 4, the means for generating the armature control signal further comprising:

c) means operatively connected to said armature winding for sensing actual armature voltage drop and for providing a signal representative thereof, and d) second summing means for deriving the difference between said signal representative of said actual armature voltage drop and said reference signal representative of desired armature voltage to provide a signal representative of the armature voltage error.

6. A system for control of a dc motor as constructed in accordance with claim 5, the means for generating the armature control signal further comprising:

e) controller means operatively connected to said second summing means, the controller means receiving the signal representative of armature voltage error and in response thereto, generating the armature control signal for varying voltage applied to said armature.

7. A system for control of a dc motor as constructed in accordance with claim 2 wherein the means for generating a field current control signal comprises:

a) means, operatively connected to the means for generating the reference signal representative of desired armature speed for deriving a signal representative of desired field current as a function of the signal representative of desired armature speed.

8. A system for control of a dc motor as constructed in accordance with claim 7, the means for generating a field current control signal further comprising:

b) means for receiving said signal representative of said armature current and for multiplying said armature current signal by a minimum field current constant to provide a reference signal representative of minimum field current;

c) summing means for summing said signal representative of said actual field current with said reference signal representative of minimum field current and with said reference signal representative of desired field current to provide a signal representative of field current error; and d) controller means for receiving the signal representative of field current error and in response thereto generating the field current control signal.

9. A system for control of a dc motor as constructed in accordance with claim 1, the means for generating the armature control signal further comprising a means operably connected to the armature current sensing means for monitoring actual armature current and for transmitting the armature current control signal to the armature voltage amplifying means only when actual armature current is less than a predetermined maximum armature current value.

10. A method for controlling a dc motor having separately excited armature and field windings and operating said dc motor anywhere under its characteristic commutation curve limit, the method comprising the steps of:

a) reading a signal representative of actual motor armature current;

b) reading a signal representative of actual motor field current;

c) deriving actual armature rotational speed as a function of actual motor armature current and actual motor field current, and generating a signal representative thereof;

d) determining armature control effort as a function of said derived actual armature rotational speed;

e) utilizing said armature control effort to control voltage applied to the armature winding; and f) repeating steps a) through e).

11. The method for controlling a dc motor in accordance with claim 10, wherein said control effort determining step (d) comprises the steps of:

i) specifying a desired armature rotational speed, and generating a signal representative thereof; and ii) determining the difference between said signal representative of actual armature rotational speed and said signal representative of desired armature rotational speed to generate a rotational speed error signal.

12. The method for controlling a dc motor in accordance with claim 11, wherein said control effort determining step (d) comprises the further steps of:

iii) determining the armature voltage drop;

iv) determining a desired armature voltage as a function of the rotational speed error signal;

v) summing said armature voltage drop with said desired armature voltage to obtain a difference signal representative of armature error; and iv) generating the armature control effort as a function of the signal representative of armature error.

13. A method for controlling a dc motor in accordance with claim 10 wherein said step of deriving armature rotational speed includes the step of computing such speed as a function of actual motor armature current and actual motor field current.

14. A method for controlling a dc motor in accordance with claim 10 wherein the step of deriving armature rotational speed includes utilizing a look-up table to ascertain armature rotational speed as a function of actual motor armature current and actual motor field current.

* * * * *